(12) United States Patent
Thompson et al.

(10) Patent No.: US 7,070,884 B2
(45) Date of Patent: Jul. 4, 2006

(54) SEPARATOR WITH IMPROVED BARRIER PERFORMANCE

(75) Inventors: Julia A. Thompson, Los Alamos, NM (US); Richard Ferencz, Isle of Palms, SC (US); Nick Mark Carter, Mooresville, NC (US)

(73) Assignee: Polymer Group, Inc., North Charleston, SC (US)

( * ) Notice: Subject to any disclaimer, the term of this patent is extended or adjusted under 35 U.S.C. 154(b) by 516 days.

(21) Appl. No.: 10/266,398

(22) Filed: Oct. 8, 2002

(65) Prior Publication Data

US 2003/0113620 A1    Jun. 19, 2003

Related U.S. Application Data

(60) Provisional application No. 60/327,913, filed on Oct. 9, 2001.

(51) Int. Cl.
*H01M 2/16* (2006.01)

(52) U.S. Cl. ............ 429/254; 429/129; 429/247; 429/248; 429/249; 429/250; 429/254; 442/327; 442/340; 442/361; 442/362; 442/363; 442/364; 442/389; 442/392; 442/400; 442/401

(58) Field of Classification Search ........... 429/129, 429/247, 248, 249, 250, 254; 442/327, 340, 442/361, 362, 364, 363, 389, 392, 400, 401
See application file for complete search history.

(56) References Cited

U.S. PATENT DOCUMENTS

| | | | |
|---|---|---|---|
| 4,273,840 A | 6/1981 | Machi et al. | |
| 4,808,467 A | 2/1989 | Suskind et al. | |
| 5,202,178 A | 4/1993 | Turner | |
| 5,401,458 A | 3/1995 | Wadsworth et al. | |
| 5,429,781 A | 7/1995 | Montgomery | |
| 5,465,688 A | 11/1995 | Hatcher | |
| 5,470,662 A | 11/1995 | Wadsworth et al. | |
| 5,482,765 A | 1/1996 | Bradley et al. | |
| 5,573,841 A | 11/1996 | Adam et al. | |
| 5,804,512 A | 9/1998 | Lickfield et al. | |
| 6,054,399 A | 4/2000 | Lebold et al. | |
| 6,548,431 B1 * | 4/2003 | Bansal et al. | 442/327 |
| 6,696,373 B1 * | 2/2004 | Kinn et al. | 442/361 |
| 2002/0142692 A1 | 10/2002 | Ferencz | |

FOREIGN PATENT DOCUMENTS

| | | |
|---|---|---|
| EP | 702994 | 3/1996 |
| EP | 754796 | 1/1997 |
| JP | 358147956 A | 9/1983 |
| WO | WO 02/29146 | 4/2002 |

OTHER PUBLICATIONS

Kirk-Othmer, Encyclopedia Of chenical Technology, 3$^{rd}$ Edition, vol. 3, beginning p. 545, 24 pages.

* cited by examiner

*Primary Examiner*—Bruce F. Bell
(74) *Attorney, Agent, or Firm*—Wood, Phillips, Katz, Clark & Mortimer

(57) ABSTRACT

The present invention is directed to a nonwoven composite fabric for use on batteries or fuel cells comprising one or more layers of fine denier spunbond filaments and at least one layer of barrier material, wherein said nonwoven composite fabric has an improved barrier performance as measured by an increase in the hydrostatic head to barrier layer basis weight ratio. In the present invention, a first fine denier layer is formed, comprising continuous spunbond thermoplastic filaments, with the size of the continuous filaments between about 0.7 and 1.2 denier, preferably less than or equal to 1 denier. A barrier layer is deposited onto the first fine denier layer. The barrier layer preferentially comprises microfibers of finite length, wherein the average fiber diameter is in the range of about 1 micron to about 10 microns, and preferably between about 1 micron and 5 microns, said layers being consolidated into a composite fabric.

8 Claims, No Drawings

SEPARATOR WITH IMPROVED BARRIER PERFORMANCE

TECHNICAL FIELD

The present invention relates generally to battery separator materials, and specifically to nonwoven fabrics with improved barrier to basis weight performance. The improved nonwoven fabrics are prepared by continuously extruding essentially endless, thermoplastic polymer, fine denier filaments. Deposition of a melt-blown barrier layer onto the fine denier filaments provides fabrics, which have exhibited enhanced barrier performance in comparison to conventional continuous filament/melt-blown constructs.

BACKGROUND OF THE INVENTION

Nonwoven fabrics are used in a wide variety of applications where the engineered qualities of the fabrics can be advantageously employed. The use of selected thermoplastic polymers in the construction of the fibrous fabric component, selected treatment of the fibrous component (either while in fibrous form or in an integrated structure), and selected use of various mechanisms by which the fibrous component is integrated into a useful fabric, are typical variables by which to adjust and alter the performance of the resultant nonwoven fabric.

In and of themselves, continuous filament fabrics are relatively highly porous, and ordinarily require an additional component in order to achieve the required barrier performance. Typically, barrier performance has been enhanced by the use of a barrier "melt-blown" layer of very fine filaments, which are drawn and fragmented by a high velocity air stream, and deposited into a self-annealing mass. Typically, such a melt-blown layer exhibits very low porosity, enhancing the barrier properties of composite fabrics formed with spunbond and melt-blown layers. Such nonwoven constructs have been utilized as battery separators as disclosed in U.S. Pat. No. 5,492,781, the disclosure of which is herein incorporated by reference.

A battery is a device that is capable of converting electrochemical energy into direct current and may be designated as either a primary or a secondary battery. The difference between primary batteries and secondary batteries is in the type of electrochemically active material that is employed. Primary batteries, or fuel cells, are defined as those battery systems that create electric current through the oxidation of fossil fuels and their derivatives. Kirk-Othmer Encyclopedia of Chemical Technology, 3, 545 et seq. (1978). As such, when the fuel is completely consumed, the life of the battery is completely exhausted. Secondary cells, on the other hand, generate electrical current through reversible chemical reactions, and thus may be recharged by applying an external current through the battery in a direction opposite to normal current flow. Id. at 569.

Batteries are made up of one or more battery cells. In its most elementary form, a battery cell comprises a pair of plates, namely, an anode and a cathode, a battery separator, and an electrolyte. When an electrical load is applied to the battery, electrons are generated through oxidation at the anode. The electrons thus generated pass through the load, then return to the battery cell at the cathode, where the cathode is reduced.

In such battery cells, the electrolytic solution, i.e., the solution containing the electrolyte, is the medium for mass transport between the plates. The primary functions of the battery separator are to prevent physical contact between the plates and to retain the electrolytic solution. In a starved-electrolyte battery cell, the separator completely occupies the space between the plates, and the electrolytic solution is completely contained within the battery separator. The battery separator thus functions as the reservoir for the electrolytic solution in such cells. The battery separator must be chemically inert so as to withstand the harsh chemical conditions found within battery cells.

Fluorocarbon polymers, preferably ethylene-fluorocarbon copolymers, particularly ethylene-chlorotrifluoroethylene (ECTFE) are known to have excellent chemical resistance and have been used in fuel cell applications. In addition, these polymers have been used to make melt spun nonwoven fabrics, particularly meltblown materials as described in U.S. Pat. No. 5,470,663 and No. 5,401,458, the disclosure of which is herein incorporated by reference.

The present invention contemplates that the provision of a fine denier spunbond layers onto which a meltblown layer is deposited significantly improves the barrier performance of the composite fabric. The fine denier spunbond layer should provide a more uniform interface between the layers during the manufacture of the nonwoven fabric resulting in improved barrier performance in the fabricated article.

SUMMARY OF THE INVENTION

The present invention is directed to a nonwoven composite fabric for use on batteries or fuel cells comprising one or more layers of fine denier spunbond filaments and at least one layer of barrier material, wherein said nonwoven composite fabric has an improved barrier performance as measured by an increase in the hydrostatic head to barrier layer basis weight ratio. In the present invention, a first fine denier layer is formed, comprising continuous spunbond thermoplastic filaments, with the size of the continuous filaments between about 0.7 and 1.2 denier, preferably less than or equal to 1 denier. A barrier layer is deposited onto the first fine denier layer. The barrier layer preferentially comprises microfibers of finite length, wherein the average fiber diameter is in the range of about 1 micron to about 10 microns, and preferably between about 1 micron and 5 microns, said layers being consolidated into a composite fabric.

The thermoplastic polymers of the continuous filament spunbond layer or layers are chosen from the group consisting of polyamides and halopolymers, with ethylene-fluorocarbon copolymers, particularly ethylene-chlorotrifluoroethylene (ECTFE) being preferred. It is within the purview of the present invention that the continuous filament spunbond layer or layers may comprise either the same or different thermoplastic polymers. Further, the continuous filaments of the spunbond layer or layers may comprise homogeneous, bicomponent, and/or multi-component profiles and the blends thereof.

The barrier layer comprises thermoplastic meltblown microfibers chosen from the group consisting of polyamides and halopolymers, with ethylene-fluorocarbon copolymers, particularly ethylene-chlorotrifluoroethylene (ECTFE) being preferred. It is within the purview of the present invention that the microfibers may comprise either the same or different thermoplastic polymers. Further, the microfibers may comprise homogeneous, bicomponent, and/or multi-component profiles and the blends thereof.

In a further aspect of the method of producing a nonwoven fabric in accordance with the present invention, formation of a composite fabric structure entails the formation of a fine denier spunbond layer, deposition of a meltblown barrier layer onto the fine denier spunbond layer, and deposition of one or more meltblown or spunbond layers.

In a fabric formed in accordance with the present invention, the incorporation of fine denier spunbond layers provide substantial improvement in barrier formation and function, allowing for reduction in the amount of the spunbond and/or barrier layer required to meet performance criteria. The substantial improvement in barrier function with the incorporation of the fine denier spunbond layer provides a more uniform support layer for the barrier layer during the manufacturing process and in improved barrier performance in the resulting end-use articles.

Formation of fabrics from fine denier spunbond materials, particularly when combined with one or more barrier meltblown layers, has been found to provide enhanced barrier properties. The present invention allows the production of a same weight fabric with improved barrier properties or a lighter weight fabric that is suitable for use as a barrier fabric, particularly for battery applications.

Other features and advantages of the present invention will become readily apparent from the following detailed description, the accompanying drawings, and the appended claims.

DETAILED DESCRIPTION

While the present invention is susceptible of embodiment in various forms, there will hereinafter be described, presently preferred embodiments, with the understanding that the present disclosure is to be considered as an exemplification of the invention, and is not intended to limit the invention to the specific embodiments disclosed herein.

The present invention is directed to a nonwoven composite fabric, which entails formation of a layer of fine denier spunbond filaments and at least one layer of barrier material. In order to achieve desired barrier properties to weight ratios for the fabric structure, the spunbond filaments preferably have a denier in the range of about 0.7 to 1.2, and preferably have a denier less than or equal to about 1. The general concept of this invention is described in the commonly owned application filed Oct. 5, 2001, and claiming priority of provisional application Serial No. 60/238,497, filed Oct. 6, 2000, with the use of polyolefin and polyester polymers; examples of which will be presented.

A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent web is collected upon the uppermost surface of the previously formed web. The web is then at least temporarily consolidated, usually by means involving heat and pressure, such as by thermal point bonding. Using this bonding means, the web or layers of webs are passed between two hot metal rolls, one of which has an embossed pattern to impart and achieve the desired degree of point bonding, usually on the order of 10 to 40 percent of the overall surface area being so bonded.

The thermoplastic polymers of the continuous filament spunbond layer or layers are chosen from the group consisting of polyamides and halopolymers, with ethylene-fluorocarbon copolymers, particularly ethylene-chlorotrifluoroethylene (ECTFE) being preferred. It is within the purview of the present invention that the continuous filament spunbond layer or layers may comprise either the same or different thermoplastic polymers. Further, the continuous filaments of the spunbond layer or layers may comprise homogeneous, bicomponent, and/or multi-component profiles and the blends thereof.

The barrier layer comprises thermoplastic meltblown microfibers chosen from the group consisting of polyamides and halopolymers, with ethylene-fluorocarbon copolymers, particularly ethylene-chlorotrifluoroethylene (ECTFE) being preferred. It is within the purview of the present invention that the microfibers may comprise either the same or different thermoplastic polymers. Further, the microfibers may comprise homogeneous, bicomponent, and/or multi-component profiles and the blends thereof.

A preferred mechanism for forming a barrier layer is through application of the meltblown process. The meltblown process is a related means to the spunbond process for forming a layer of a nonwoven fabric, wherein, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first and subsequent layers through consolidation of the layers to form a composite fabric. It is also within the purview of the present invention to further include, juxtaposed to the meltblown barrier layer, additional layers selected from the group consisting of nonwoven, fabrics, woven fabrics, films and combinations thereof.

To form fine denier spunbond layers from conventional spunbond equipment, several process parameters are modified. The fine-fiber spunbond material is made by decreasing the extrusion rate, while increasing the rate of draw of the filaments. A thermoplastic polymer can be selected to provide adequate melt strength so as to minimize fiber breaks during the fiber draw-down process. The actual extrusion and quench temperatures utilized and the other specific changes to the process will depend upon the polymer resin and the specific spunbond equipment. Specialized, performance-enhanced spunbond layers such as those high-speed spinning processes taught in U.S. Pat. No. 5,885,909, herein incorporated, can also be practiced.

The meltblown process, as well as the cross-sectional profile of the spunbond filament or meltblown microfiber are not a critical limitation to the practice of the present invention.

By providing a fine denier spunbond layer upon which the meltblown layer may deposited, several enhancements of the fabric are realized. For a given basis weight of the spunbond layer, a finer denier fabric will give a greater number of filaments and a smaller average pore size. The smaller average pore size will result in a more uniform deposition of the meltblown microfibers onto the spunbond layer. A more uniform meltblown layer will have fewer weak points in the web at which a failure in barrier performance can occur. The spunbond layer also serves to support the meltblown layer structurally in the composite material. A finer denier spunbond layer provides a smaller average pore size and a larger number of support points for the barrier layer, this results in shorter spans of unsupported meltblown microfibers. This mechanism embodies the well-known concept that reduction in the average span length results in enhanced structural integrity.

EXAMPLES

Example 1 is a conventional SMS fabric comprising a spunbond layer basis weight being 17 gsm and a meltblown basis weight being 10 gsm. This construct was made in accordance with standard practices as applied to equipment supplied by Reifenhauser GmbH for the formation of fabric by thermal point bonding in a diamond pattern at a coverage area of 17%. A thermoplastic resin was provided in the form of polypropylene as available from Exxon Corporation as type 3155.

Example 2 is a conventional SMMS fabric comprising a spunbond layer basis weight being 15 gsm and a meltblown basis weight being 7.5 gsm. This construct was made in accordance with standard practices as applied to equipment supplied by Reifenhauser GmbH for the formation of fabric by thermal point bonding in a diamond pattern at a coverage area of 17%. A thermoplastic resin was provided in the form of polypropylene as available from Exxon Corporation as type 3155.

Example 3 is an SMS fabric made in accordance with the present invention, comprising a spunbond layer basis weight being 17 gsm and a meltblown basis weight being 8 gsm. The polypropylene resin used to form the spunbond layer was Achieve® 3854 available from Exxon Corporation. This construct was made in accordance with standard practices as applied to equipment supplied by Reifenhauser GmbH for the formation of fabric by thermal point bonding in an oval pattern at a coverage area of 18%.

Example 4 is an SMMS fabric made in accordance with the present invention, comprising a spunbond layer basis weight being 10 gsm and a meltblown basis weight being 5 gsm. The polypropylene resin used to form the spunbond layer was Achieve® 3854 available from Exxon Corporation. This construct was made in accordance with standard practices as applied to equipment supplied by Reifenhauser GmbH for the formation of fabric by thermal point bonding in an oval pattern at a coverage area of 18%.

Example 5 is an SMMS fabric made in accordance with the present invention, comprising a spunbond layer basis weight being 17 gsm and a meltblown basis weight being 8 gsm. The polypropylene resin used to form the spunbond layer was Achieve® 3854 available from Exxon Corporation. This construct was made in accordance with standard practices as applied to equipment supplied by Reifenhauser GmbH for the formation of fabric by thermal point bonding in an oval pattern at a coverage area of 18%.

Example 6 is an SMMS fabric made in accordance with the present invention, comprising a spunbond layer basis weight being 6 gsm and a meltblown basis weight being 2.5 gsm. The polypropylene resin used to form the spunbond layer was Achieve® 3854 available from Exxon Corporation. This construct was made in accordance with standard practices as applied to equipment supplied by Reifenhauser GmbH for the formation of fabric by thermal point bonding in an oval pattern at a coverage area of 18%.

Example 7 is an SMMS fabric made in accordance with the present invention, comprising a spunbond layer basis weight being 7 gsm and a meltblown basis weight being 3 gsm. The polypropylene resin used to form the spunbond layer was Achieve® 3854 available from Exxon Corporation. This construct was made in accordance with standard practices as applied to equipment supplied by Reifenhauser GmbH for the formation of fabric by thermal point bonding in an oval pattern at a coverage area of 18%.

For comparison purposes, examples of SMS fabrics from the U.S. patent literature are also included in Table 1. Comparative sample A is a polypropylene SMS fabric described in U.S. Pat. No. 5,464,688. Comparative sample B is a polypropylene SMS fabric described in U.S. Pat. No. 5,482,765.

Table 1 sets forth composite fabrics formed in accordance with the present invention compared to conventional SMS and SMMS fabrics. In Table 1, the regular denier SMS material (Example 1) is shown as having layers formed with various individual basis weights of 17 gsm/10 gsm/17 gsm. The denier of the spunbond layer was measured by common technique and was found to be 1.7 denier. The meltblown fiber diameters were measured to give an average of 2.0 microns. An SMMS material is also shown in Table 1 shown as having layers formed with various individual basis weights of 15 gsm/7.5 gsm/7.5 gsm/15 gsm. The spunbond layers have filaments of 2.3 denier and the average meltblown diameter is 2.8 microns. The conventional SMS and SMMS fabrics exhibit hydrostatic head values of 36.8 and 53 cm respectively. Normalization of the hydrostatic head values for the two constructions to the meltblown basis weight gives values of 3.7 and 3.5 cm/gsm, respectively.

Example 3 represents a polypropylene SMS fabric made in accordance with the invention, with individual layers of the following basis weights, 17 gsm/8 gsm/17 gsm. The denier of the spunbond layer was measured by common technique and was found to be 1.0 denier. The meltblown fiber diameters were measured to give an average of 2.1 microns. The hydrostatic head to basis weight ratio for the fabric of Example 3 is 6.1. The improvement of barrier property in the material made in accordance with this invention as measured by hydrostatic head represents a 65% increase per gram per square meter of the meltblown barrier layer.

Comparative sample of SMS barrier fabrics reported in the U.S. Patent literature are listed in Table 1. Testing was done in accordance with the following standard test methods.

| Test | Method |
| --- | --- |
| Basis weight (grams/meter$^2$) | ASTM D3776 |
| Tensiles MD and CD Grabs (g/cm) | ASTM D5034 |
| Elongation MD and CD Grabs (%) | ASTM D5034 |
| Tensiles MD and CD Strips (g/cm) | ASTM D5035 |
| Elongation MD and CD Strips (%) | ASTM D5035 |
| Hydrostatic head (cm) | INDA 80.4 |

The total basis weight for these two fabrics is 47 and 54 gsm respectively, with each fabric having a meltblown basis weight of 17 gsm. The hydrostatic head to basis weight ratio for these products are 1.8 and 3.1 cm/gsm respectively. These values are significantly lower than the values found for Example 3.

Example 4 represents a polypropylene SMMS fabric made in accordance with the invention, with individual layers of the following basis weights, 10 gsm/5 gsm/5 gsm/10 gsm. The denier of the spunbond layer was measured by common technique and was found to be 1.1 denier. The meltblown fiber diameters were measured to give an average of 1.9 microns. The hydrostatic head to basis weight ratio for the fabric of Example 4 is 4.9 cm/gsm. The improvement of barrier property in the material made in accordance with this invention as measured by hydrostatic head represents a 40% increase per gram per square meter of the meltblown barrier layer.

Example 5 is an SMMS fabric made in accordance with the present invention, comprising a spunbond layer basis weight being 17 gsm and a melt-blown basis weight being 8 gsm. The polypropylene resin used to form the spunbond layer was Achieve 3854 available from Exxon Corporation. This construct was made in accordance with standard practices as applied to equipment supplied by Reifenhauser GmbH for the formation of fabric by thermal point bonding in an oval pattern at a coverage area of 18%.

Other representative fabrics are presented in Table 1. Examples 6–7 demonstrate the high ratio of hydrostatic head to meltblown basis weight, 7.4 and 7.8 cm/gsm respectively, in lightweight constructs as embodied in the present invention. Such lightweight constructs are particularly advantageous when used in the fabrication of end-use articles requiring significant barrier performance.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

TABLE 1

| PROPERTY | UNIT | Examples | | | | | Comparative Examples | |
|---|---|---|---|---|---|---|---|---|
| | | 1 | 2 | 3 | 4 | 5 | A | B |
| Layer basis weight | gsm | 17/10/17 | 15/7.5/7.5/15 | 17/8/17 | 10/5/5/10 | 17/8/8/17 | 15/17/15 | 18.7/17/18.7 |
| Fabric basis weight | gsm | 44 | 45 | 42 | 30 | 50 | 47 | 54 |
| Melt blown basis weight | gsm | 10 | 15 | 8 | 10 | 16 | 17 | 17 |
| MD Grabs | g/cm | 5960 | 4590 | 8102 | 4890 | 3776 | — | — |
| CD Grabs | g/cm | 4120 | 3253 | 6472 | 3473 | 2631 | — | — |
| MD Elongation | % | 62 | 55.5 | 50 | 50 | 39 | — | — |
| CD Elongation | % | 80 | 65.5 | 72 | 64 | 57 | — | — |
| Hydrostatic head (HSH) | cm | 36.8 | 53 | 49 | 49 | 90 | 29.9 | 53 |
| HSH/Melt-blown Basis Weight | cm/gsm | 3.7 | 3.5 | 6.1 | 4.9 | 5.6 | 1.8 | 3.1 |

TABLE 2

| PROPERTY | UNIT | Examples | |
|---|---|---|---|
| | | 6 | 7 |
| Layer basis weight | gsm | 6/2.5/2.5/6 | 7/2/2/7 |
| Fabric basis weight | gsm | 17 | 18 |
| Melt blown basis weight | gsm | 5 | 4 |
| MD Strips | g/cm | 448 | 324 |
| CD Strips | g/cm | 121 | 61 |
| MD Elongation | % | 19 | 20 |
| CD Elongation | % | 121 | 30 |
| Hydrostatic head (HSH) | cm | 37 | 31 |
| HSH/Melt-blown Basis Weight | cm/gsm | 7.4 | 7.8 |

What is claimed is:

1. A battery separator material, comprising
    a) a fine-denier spunbond layer comprising a plurality of continuous thermoplastic filaments having a denier of between 0.7 and 1.2 denier; and
    b) a melt-blown barrier layer material deposited uniformly onto the fine denier spunbond layer and the layers consolidated to form a battery separator material;
    c) said layers being chosen from the group consisting of polyamides and halopolymers;
    d) whereby said battery separator material has a hydrostatic head to melt-blown layer basis weight ratio of at least 3.5 cm/gsm.

2. A battery separator as in claim 1 further comprising one or more additional layers juxtaposed to the melt-blown barrier layer, said additional layers being selected from the group consisting of nonwoven, fabrics, woven fabrics, films and combinations thereof.

3. A battery separator as in claim 1 wherein at least the barrier layer is preferably composed of ethylene-fluorinated ethylene copolymers.

4. A battery separator material as in claim 1, wherein the continuous filaments may comprise bicomponent, multi-component profiles and the blends thereof.

5. A battery separator material as in claim 1, wherein said layer are consolidated by means of consolidation chosen from the group consisting of pressure bonding, thermal calendering, and through-air bonding.

6. A method of forming a battery separator material, comprising the step of
    a) providing a first fine-denier spunbond layer comprising a plurality of continuous thermoplastic filaments having a denier of between 0.7 and 1.2 denier;
    b) depositing a meltblown layer material onto the first fine denier spunbond layer to provide a melt-blown layer barrier layer; and
    c) depositing a second spunbond layer deposited onto the barrier layer;
    d) said layers being chosen from the group consisting of polyamides and halopolymers; and
    e) the first fine denier spunbond layer, the barrier layer, and the second spunbond layer being consolidated into a battery separator material.

7. A method of forming a battery separator material as in claim 6, wherein the second spunbond layer is a fine-denier spunbond layer comprising a plurality of continuous thermoplastic filaments having a denier of between 0.7 and 1.2 denier.

8. A method of forming a barrier layer in accordance with claim 6, wherein said battery separator has a hydrostatic head to meltblown layer basis weight ratio of at least 3.5 cm/gsm.

* * * * *